Figure 7:
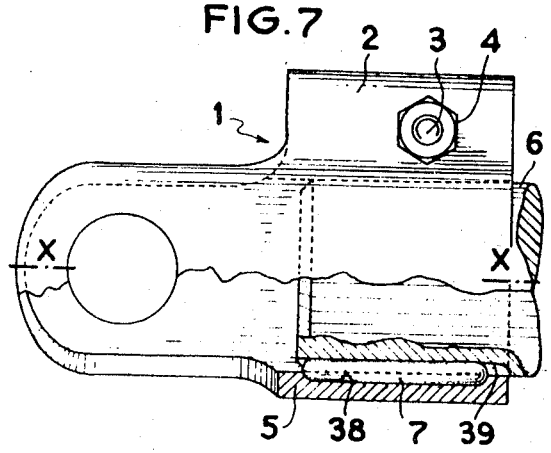

United States Patent

[11] 3,612,582

| | | |
|---|---|---|
| [72] | Inventor | Alfred Pitner<br>Paris, France |
| [21] | Appl. No. | 855,116 |
| [22] | Filed | Sept. 4, 1969 |
| [45] | Patented | Oct. 12, 1971 |
| [73] | Assignee | Nadella<br>Rueil-Malmaison, France |
| [32] | Priority | Mar. 20, 1969, Nov. 29, 1968, Sept. 5, 1968 |
| [33] | | France |
| [31] | | 6908026, 175 966 and 165 125 |

[54] SHAFT ASSEMBLIES
9 Claims, 11 Drawing Figs.

[52] U.S. Cl. .................................................... 287/52.05,
   287/109, 29/526, 64/17
[51] Int. Cl. ..................................................... F16b 7/00
[50] Field of Search............................................ 287/53 LK,
   109, 103 R, 103 D, 104, 118, 189.36 C, 189.36 F,
   52.06, 52.05, 113, 115, DIG. 10; 64/17; 29/521,
   526

[56] References Cited
UNITED STATES PATENTS

| | | | |
|---|---|---|---|
| 3,060,706 | 10/1962 | Hess.............................. | 287/53 LK X |
| 3,236,572 | 2/1966 | White............................ | 287/52.06 X |
| 3,501,928 | 3/1970 | Pitner........................... | 287/109 X |

Primary Examiner—David J. Williamowsky
Assistant Examiner—Wayne L. Shedd
Attorney—Robert E. Burns ABSTRACT: The invention concerns the mounting of a power transmission member on a shaft and relates more especially to the mounting of universal joint yokes on their associated shafts. The invention provides each yoke with a hub for fitting over the shaft and a generally cylindrical dowel pin or key is used both to secure the yoke on the shaft and to fix the two in driving relation. The pin or key is interposed between the shaft and the yoke hub in a seating formed in one or the other either by driving in the pin or key, itself acting as a punch tool for this purpose, or by using a punch of which at least the working part has a shape identical to that of the pin or key. In another feature of the invention, a die tool slidable in a die assembly for holding the shaft and the pin is used to press the pin into the shaft to form the latter with a seating for the pin.

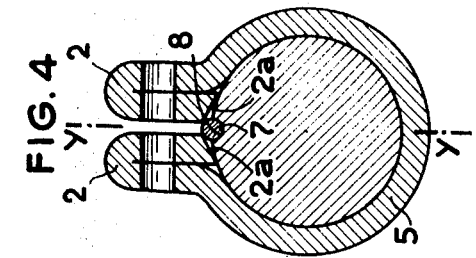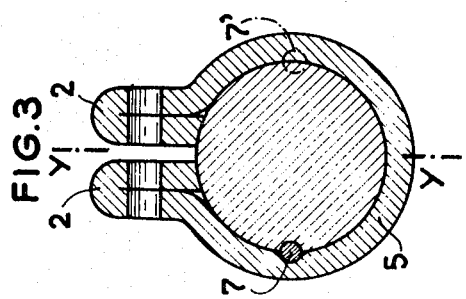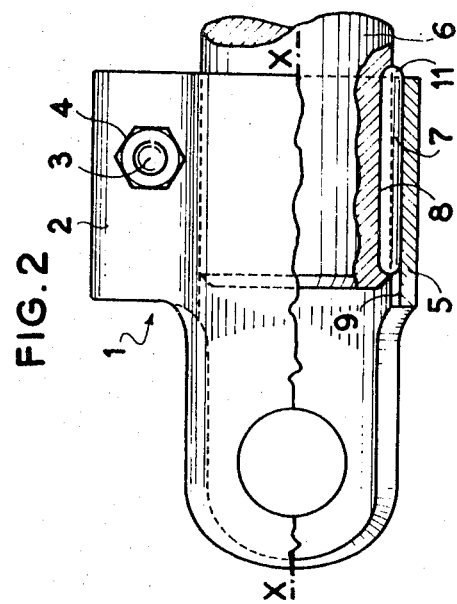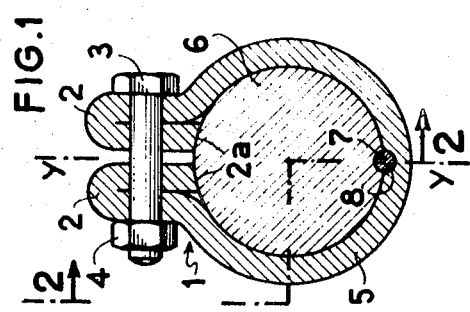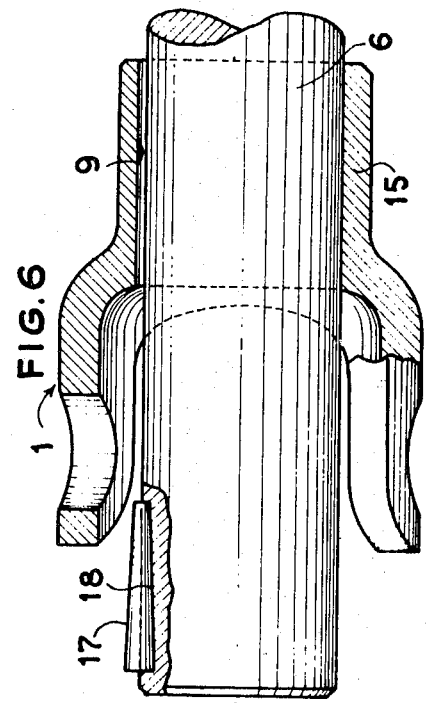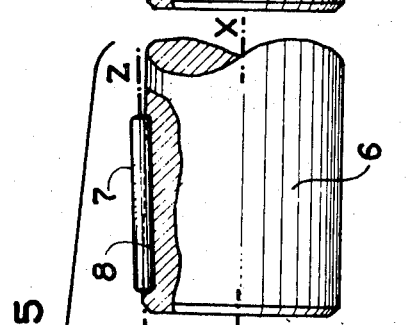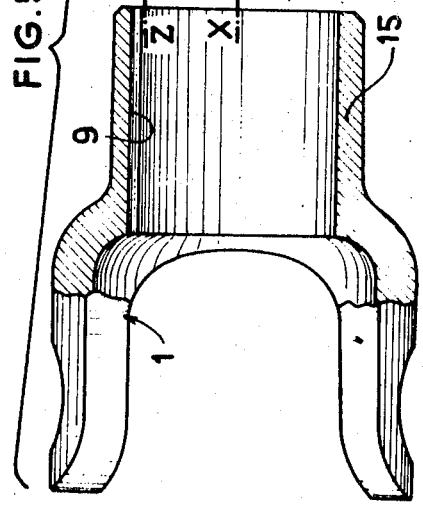

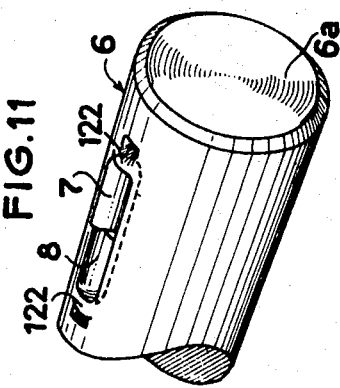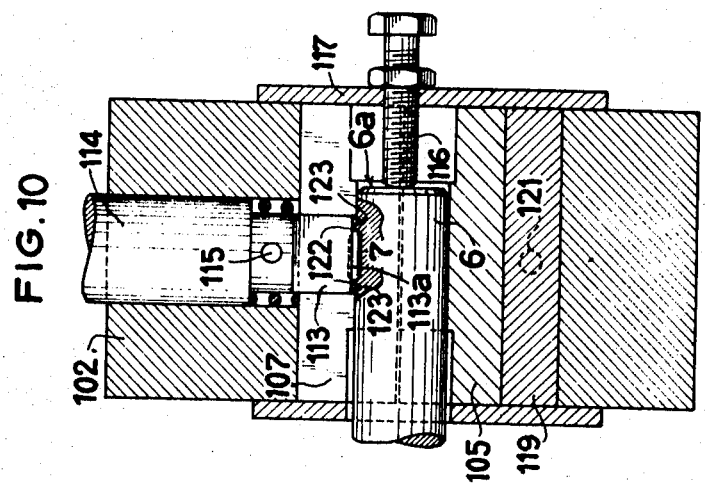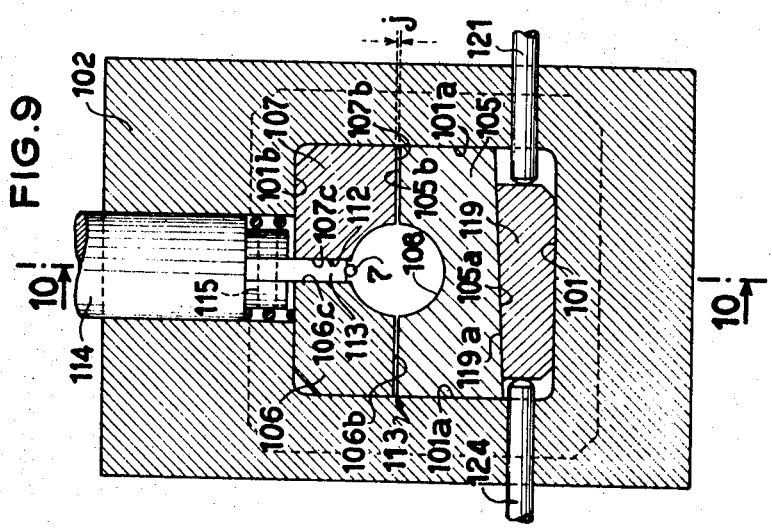

SHAFT ASSEMBLIES

This invention concerns shaft assemblies and relates more particularly to a two-part assembly including a shaft and a transmission member, such as a yoke for a Cardan joint, said yoke having a hub for engaging the shaft.

The invention seeks to provide a precise and safe assembly and to provide an assembly which is particularly applicable to the steering mechanisms of motor vehicles comprising a steering shaft connected to two universal joints respectively to the steering wheel and to the steering box.

An assembly according to the present invention is characterized by at least one intermediate key of generally cylindrical shape, which is wedged immovably against two circumferentially spaced supporting surfaces on the shaft and two circumferentially spaced supporting surfaces on the hub, one of said two pairs of circumferentially spaced supporting surfaces defining a seating or keyway for said key and being obtained by cold deformation of the corresponding shaft or hub surface by means of a tool in combination with a support surface of cylindrical shape such that it limits radial deformations of the shaft during the shaping of the seating, said tool, constituting a punch, of which the active part is identical in shape to that of said intermediate key or which is constituted by the latter.

As compared with the prior art this arrangement gives the advantage, especially in the assembling of Cardan joints to the two extremities of a steering shaft, of a good precision in the angular setting of the two joints and avoids the disadvantages of previous proposals which necessitate removal of metal of machining, to provide either a multiple groove arrangement or a single groove intended in either case to receive a pin or a key of appropriate shape. Good precision is also obtained of the shape of the supporting surfaces against which the intermediate key is wedged, owing to the shaping without removal of metal, by means of a tool which may be the intermediate key itself.

It may be added that the cold working resulting from the cold deformation operation produces a hardening of the surfaces which contributes to the quality of the assembly.

The cold deformation is preferably applied to the cylindrical surface of the shaft or of the hub, to provide a seating in that component for receiving the intermediate key.

Conveniently, a groove formed in the surface of the other component of the assembly presents sides which constitute the other pair of circumferential supporting surfaces.

According to another feature, the invention also provides an apparatus for effecting the assembly defined above and more particularly for shaping in the cold, at the periphery of the shaft, a semicylindrical seating or groove and for mounting in this seating the intermediate key intended for the assembling of the shaft with the hub of a transmission member.

This apparatus is characterized in that it comprises a die which includes a slot in which a tool can slide in order to push the intermediate key against and into the surface of the shaft, the latter being located in a bore of cylindrical shape arranged to limit radial deformation of the shaft during the shaping of the seating.

By virtue of this arrangement the cylindrical shape of the shaft is maintained in spite of the stresses resulting from the shaping of the seating.

Preferably, the die is formed of at least two parts in which conjugate surfaces demarcate the bore and the shaft is enclosed and fixed inside the bore under the effect of means exerting on the die a thrust balanced by the reaction of the die mounting.

Figure 8:
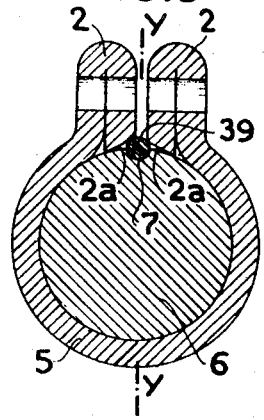

The invention will be described further, by way of example, with reference to the accompanying drawings, in which:

FIG. 1 is a radial section through a split hub of a Cardan joint yoke assembled on a shaft, FIG. 2 is a section taken on the line 2—2 of FIG. 1, FIGS. 3 and 4 show two modifications of the yoke and shaft assembly of FIG. 1, FIG. 5 is an elevation, partly in axial section, of a shaft and yoke assembly wherein the yoke has a circumferentially continuous hub, FIG. 6 is an elevation, similar to that of FIG. 5 of a further embodiment employing a yoke with a circumferentially continuous hub, FIG. 7 is a section similar to that of FIG. 2, of a shaft and yoke assembly, in which an intermediate key is inserted in a groove in the hub, FIG. 8 is a radial section of a modification of the assembly illustrated in FIG. 4, FIG. 9 is a transverse section of an apparatus for the construction of a shaft and yoke assembly according to FIGS. 1 to 4, FIG. 10 is a section taken along the line 10—10 of FIG. 9, and FIG. 11 is a perspective view of a shaft provided with an intermediate key positioned by means of the apparatus shown in FIGS. 9 and 10.

FIGS. 1 and 2 illustrate a Cardan joint yoke 1 which is manufactured by stamping and rolling a sheet metal blank, generally as described in French Pat. Specification No. 1,515,051, the blank having end portions which are folded over on themselves to form two lugs 2. A bolt 3 cooperating with a tightening nut 4 and passing through the lugs 2 enables a cylindrical hub 5 of the yoke to be tightened and clamped on a shaft 6 inserted inside the hub. The free ends 2a of the bent-over blank portions forming the lugs 2 rest on the periphery of the shaft 6. A rigid connection between the shaft 6 and the hub is obtained by means of an intermediate key 7 in the form of a cylindrical dowel pin with rounded ends, which is inserted without play in a seating or keyway 8 of the shaft, the keyway being produced by driving in a punch having an operation portion which is of the same shape as the key 7, or which is constituted by the key. It will be noted that the key 7 is engaged in a groove 9 of semicircular profile machined in the bore of the hub 5.

The length and the position of the intermediate key 7 are such that one of its ends 11 projects and is visible beyond the surface of the hub 5, thereby enabling it to be observed when it is initially being driven into its illustrated position.

Whereas in FIG. 1 the groove 9 of the hub is located in the plane of symmetry Y—Y of the yoke and is opposite to the circumferential discontinuity in the hub, the said groove is located in a plane perpendicular to the plane Y—Y in FIG. 3, so that the intermediate key 7 acts as an appreciable reinforcement in this part of the hub which is subjected to considerable torsional stresses. It is obviously possible, as indicated at 7', to provide for a second intermediate key positioned symmetrically with the key 7 with respect to he plane Y—Y in order to balance the loads.

In FIG. 4, the hub 5 is not provided with a groove 9 and the intermediate key 7, located in the plane of symmetry Y—Y, is inserted in the seating or keyway 8 of the shaft and is wedged centrally beneath the free ends 2a of the bent-over lugs 2. For this purpose, the free ends 2a advantageously adopt a bevelled shape which is tightened against the key 7 by screwing the nut 4.

In the case of a continuous or circumferentially uninterrupted hub, such as those shown in FIGS. 5 and 6, the mounting facilities resulting from the initially open configuration of a slotted hub are not present and it is necessary to assemble the shaft to the hub somewhat in the manner of a coupling.

In FIG. 5, the intermediate cylindrical key 7 is shown in a seating 8 formed in the shaft and having an axis Z—Z inclined at a small angle to the axis X—X of the shaft itself. For assembling the shaft 6 to the continuous hub 15 of the yoke 1, the key 7 is fitted to the shaft and the latter is forced into the bore of the hub 15, so that the key 7 enters into and is wedged in a semicylindrical groove 9 formed in the hub 15. A jig or the like device for effecting this operation conveniently comprises a clamping member adapted to maintain the key 7 properly positioned in its seating 8 during the greater part of the operation, so as to prevent the key from rocking and possibly damaging the parts adjacent to it.

In the embodiment illustrated in FIG. 6, a key 17 is of sightly conical or tapered configuration and a seating 18 intended to receive it has exactly the same conical profile so that the key can be inserted therein without play. The assembly of the shaft to the yoke is carried out by sliding the yoke 1 on to the shaft 6 before the key engages with the groove 9 provided to receive it in the hub. In addition, the length of the key 17 is made such that when, in the assembled condition of the completed universal joint, the shaft abuts against the cross member which is mounted in the yoke, the key does not become disengaged from the groove. Thus, should the shaft accidentally suffer an axially directed shock sufficiently violent to permit the shaft to become unclamped and to slide in the bore of the hub, the driving connection which the key establishes between the hub and the shaft, although weakened, remains effective.

The Cardan joint yoke 1 shown in FIG. 7 is obtained, as in FIGS. 1 and 2, by stamping and bending a sheet metal blank, but the assembly of its hub 5 with the shaft 6, by means of the intermediate key 7, is effected by inserting the latter in a seating 38 of the hub 5 produced similarly to the seating 8 in FIG. 2, by driving in a punch of which the active part is of a shape identical with that of the key, or which is itself constituted by the key, the key also being engaged in a groove 39, for example of semicircular profile, machined in the surface of the shaft 6.

It is advantageous for the shaping of the seating 38 to be effected by a rolling operation performed on the flat sheet metal blank from which the yoke is obtained.

In the construction illustrated in FIG. 8, the hub 5 has not semicircular seating and the intermediate key 7 located in the plane of symmetry Y—Y and inserted in a groove 39 previously machined or otherwise formed in the shaft, is wedge against the free ends 2a of the bent-over lugs 2 which, when the nut 4 is tightened undergo a cold deformation to form a bevel edge assuming a cylindrical shape at the region of contact with the key 7.

It will be appreciated that, as alternatives to the constructions described with reference to FIGS. 3, 5, and 6, the key 7 or 17 respectively may be located in a seating obtained by cold deformation, not of the shaft 6, but of the hub 5 or 15.

The apparatus shown in FIGS. 9 and 10 comprises a rigid framework 102 formed with a rectangular cavity 101 wherein is arranged a die 103 which can be displaced against the vertical walls 101a of the cavity and which is composed of three parts 105, 106, 107, defining in the middle of the die a cylindrical bore 108 for the reception of the shaft 6 in which the seating 8 intended to receive the cylindrical intermediate key 7 has to be formed.

The lower part 105 of the die extends over the whole width of the die cavity 101. It comprises a lower face 105a obliquely oriented with respect to the walls of the cavity and an upper horizontal face 105b, which coincides approximately with a diameter of the bore 108. The upper parts 106, 107, which also have respective faces 106b, 107b, coinciding with a horizontal diameter of the bore 108, have a width a little less than half the width of the cavity 101, so as to provide between their adjacent vertical faces 106a, 107a, a slot 112 in which a narrow tool 113 can slide, the tool 113 being connected by a pin 115 with a cylindrical shaft 114 which is, for example, a press punch.

The tool 113 is intended to thrust the key 7 against the cylindrical surface of the shaft 6 inside the bore 108 of the die, in order to form that surface by cold deformation with the seating 8.

The shaft is introduced into the bore 108 when the tool 113 is in a withdrawn position, the axial position of the shaft being defined by contact of its end face 6a with an adjustable stop 116 screwed, for example, through a plate 117 fixed on the frame. The shaft is locked inside the bore 108 by clamping the parts of the die together leaving only a clearance j between the diametral faces. The clamping is effected by means of a wedge 119, of which the oblique face 119a comes in contact with the lower face 105a of the part 105 of the die and which is displaced by means of a transverse push-rod 121 passing through the frame.

The intermediate key 7 is normally retained in its seating 8 (see FIG. 11) by imparting a set 122 to the extremities of the seating under the action of two auxiliary punches 123 provided on the leading edge 113a of the tool 113.

The release of the shaft 6 after fitting the key 7 is effected by means of a push-rod 124 opposed to the push-rod 121.

It will, of course, be understood that the apparatus shown in FIGS. 9 and 10 is intended to be used in conjunction with means such as a double-acting press for controlling the clamping and withdrawal movements of the die and for the operation of the die tool 113, but as such a press of itself forms no part of the invention, it is not described in detail herein.

I claim:

1. An assembly comprising a shaft member and a power transmission member such as a yoke member for a universal joint, a hub in said power transmission member in coaxial and embracing relation to said shaft member means for holding said hub in tightly embracing relation with said shaft, said shaft member having a first pair of circumferentially spaced supporting surfaces and the hub of said power transmission member having a second pair of circumferentially spaced supporting surfaces registerable with said first pair of supporting surfaces, and an intermediate key having a substantially circular cross-sectional shape immovably engaged between said pairs of surfaces, each surface of the pair of circumferentially spaced surfaces of one of said members being defined by an integral deformation in surface material of said one member and being in close engagement with a portion of said key of identical shape whereby said hub is immorably retained on said shaft.

2. An assembly as set forth in claim 1, wherein the other of said members has a groove having sides which constitute the pair of circumferentially spaced supporting surfaces of the other of said members.

3. An assembly as set forth in claim 1, wherein said first pair of circumferentially spaced surfaces are part of a key seating defined by said integral deformation in surface material in said shaft member.

4. As assembly as set forth in claim 1, wherein the hub comprises a strip of sheet metal having two integral end lugs and having a shape of a split tube, said lugs defining the split in the tube, each lug comprising an intermediate portion of said strip and a free end portion of said strip in folded and adjoining relation to each other and substantially parallel to an axial plane of said hub, said assembly further comprising means combined with said lugs for urging said lugs toward each other, said one member being said shaft member, a seating in said shaft member comprising said first pair of supporting surfaces and the intermediate key being inserted in said seating and in trapped and engaged relation to said second pair of supporting surfaces which are carried by said free end portions of said strip.

5. An assembly as set forth in claim 1, wherein the hub comprises a strip of sheet metal having two integral end lugs and having a shape of a split tube, said lugs defining the split in the tube, each lug comprising an intermediate portion of said strip and a free end portion of said strip in folded and adjoining relation to each other and substantially parallel to an axial plane of said hub, said assembly further comprising means combined with said hubs for urging said lugs toward each other, said second pair of supporting surfaces being defined by integral deformations in surface material of said free end portions of said strip.

6. An assembly as set forth in claim 2, wherein, in order to facilitate insertion of the intermediate key into engagement with said pairs of supporting surfaces, said key has generatrices which are slightly oblique with respect to the axis common to said hub and said shaft member.

7. An assembly as set forth in claim 6, wherein the key is cylindrical and one of said pairs of supporting surfaces is defined by a part-cylindrical seating having an axis which is slightly inclined with respect to the axis common to said shaft member and said hub.

8. An assembly as set forth in claim 6, wherein the intermediate key is slightly conical and is engaged in a complementary seating in said one member and defining the pair of supporting surfaces in said one member.

9. An assembly as set forth in claim 1, wherein the hub comprises a strip of sheet metal having two integral end lugs and having a shape of a split tube, said lugs defining the split in the tube, each lug comprising an intermediate portion of said strip and a free end portion of said strip in folded and adjoining relation to each other and substantially parallel to an axial plane of said hub, said assembly further comprising means combined with said lugs for urging said lugs toward each other, said second pair of supporting surfaces being defined by a seating which is an integral deformation in original surface material of the interior of the hub.

UNITED STATES PATENT OFFICE
CERTIFICATE OF CORRECTION

Patent No. 3,612,582                    Dated October 12, 1971

Inventor(s) ALFRED PITNER

It is certified that error appears in the above-identified patent and that said Letters Patent are hereby corrected as shown below:

In the heading to the patent, item "[73] Assignee" should be amended by making the following insertion as a third line beneath the Assignee's address:

--undivided one-half interest--

Signed and sealed this 23rd day of April 1974.

(SEAL)
Attest:

EDWARD M. FLETCHER, JR.　　　　　　　　C. MARSHALL DANN
Attesting Officer　　　　　　　　　　　　Commissioner of Patents